United States Patent
Beaurepaire et al.

(10) Patent No.: US 9,014,977 B2
(45) Date of Patent: Apr. 21, 2015

(54) METHOD AND APPARATUS FOR ROUTE DETERMINATION BASED ON ONE OR MORE NON-TRAVEL LANES

(71) Applicant: HERE Global B.V., Veldhoven (NL)

(72) Inventors: Jerome Beaurepaire, Berlin (DE); Philippe Beaurepaire, Lamballe (FR)

(73) Assignee: HERE Global B.V., Veldhoven (NL)

( * ) Notice: Subject to any disclaimer, the term of this patent is extended or adjusted under 35 U.S.C. 154(b) by 0 days.

(21) Appl. No.: 13/924,251

(22) Filed: Jun. 21, 2013

(65) Prior Publication Data
US 2014/0379258 A1 Dec. 25, 2014

(51) Int. Cl.
*G01C 21/34* (2006.01)
*G08G 1/01* (2006.01)

(52) U.S. Cl.
CPC ............ *G01C 21/34* (2013.01); *G01C 21/3453* (2013.01); *G08G 1/0104* (2013.01); *G01C 21/3492* (2013.01); *G01C 21/3415* (2013.01)

(58) Field of Classification Search
CPC ........... G01C 21/3492; G01C 21/3415; G01C 21/3453; G01C 21/26; G08G 1/0104; B60R 16/0373
USPC .......... 701/400, 411, 414–417, 533; 340/988
See application file for complete search history.

(56) References Cited

U.S. PATENT DOCUMENTS

| | | | |
|---|---|---|---|
| 5,612,882 A * | 3/1997 | LeFebvre et al. | 701/423 |
| 6,101,443 A * | 8/2000 | Kato et al. | 701/414 |
| 6,853,915 B2 * | 2/2005 | Hubschneider et al. | 701/420 |
| 2009/0171563 A1 | 7/2009 | Morimoto et al. | |
| 2010/0332121 A1 * | 12/2010 | Okude et al. | 701/201 |

FOREIGN PATENT DOCUMENTS

| | | |
|---|---|---|
| JP | 2008-268149 A | 11/2008 |
| JP | 2009-210467 A | 9/2009 |
| WO | 93/05492 A1 | 3/1993 |
| WO | 2010/040404 A1 | 4/2010 |
| WO | 2012/092276 A2 | 7/2012 |

OTHER PUBLICATIONS

S. Bozkurt et al., "A Multicriteria Route Planning Approach Considering Driver Preferences", abstract of research paper, dated Jul. 24-27, 2012, pp. 324-328.

Notification of Transmittal of The International Search Report and The Written Opinion of The International Searching Authority, or the Declaration; International Search Report; Written Opinion of The International Searching Authority for corresponding International Application No. PCT/EP2014/062057, dated Sep. 10, 2014, 8 pages.

(Continued)

*Primary Examiner* — Gertrude Arthur Jeanglaude
(74) *Attorney, Agent, or Firm* — Ditthavong & Steiner, P.C.

(57) ABSTRACT

An approach is provided for determining one or more non-travel lanes in at least one route segment. The approach involves determining whether to include the at least one route segment in a navigation route based, at least in part, on a minimization of a risk of being blocked by the one or more non-travel lanes.

20 Claims, 14 Drawing Sheets

(56) References Cited

OTHER PUBLICATIONS

Shoup et al., "Cruising for parking", Transport policy, vol. 13, No. 6, Nov. 1, 2006, pp. 479-486.

Arnott et al., "An integrated model of downtown parking and traffic congestion", Journal of Urban Economics, vol. 60, No. 3, Nov. 1, 2006, pp. 418-442.

* cited by examiner

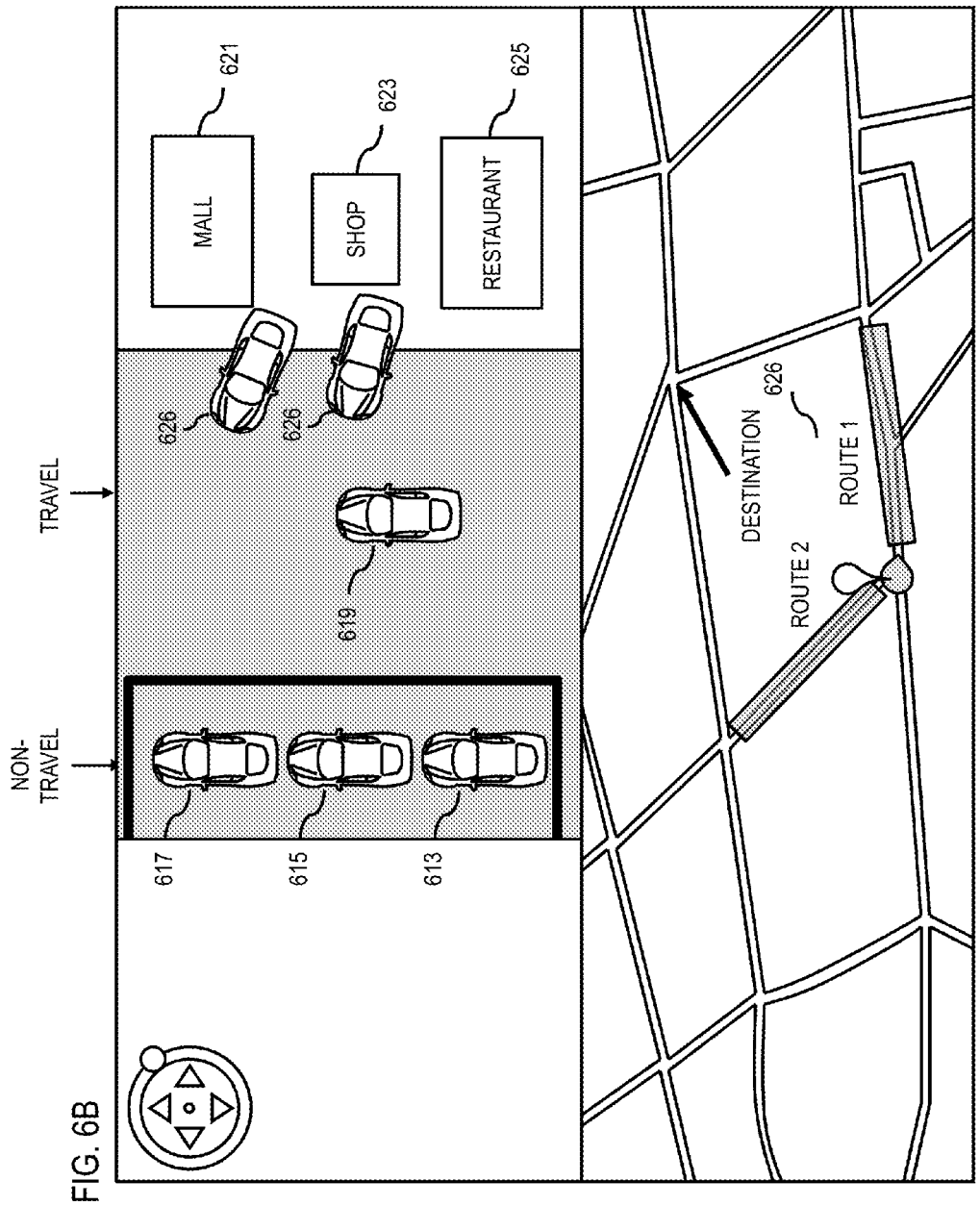

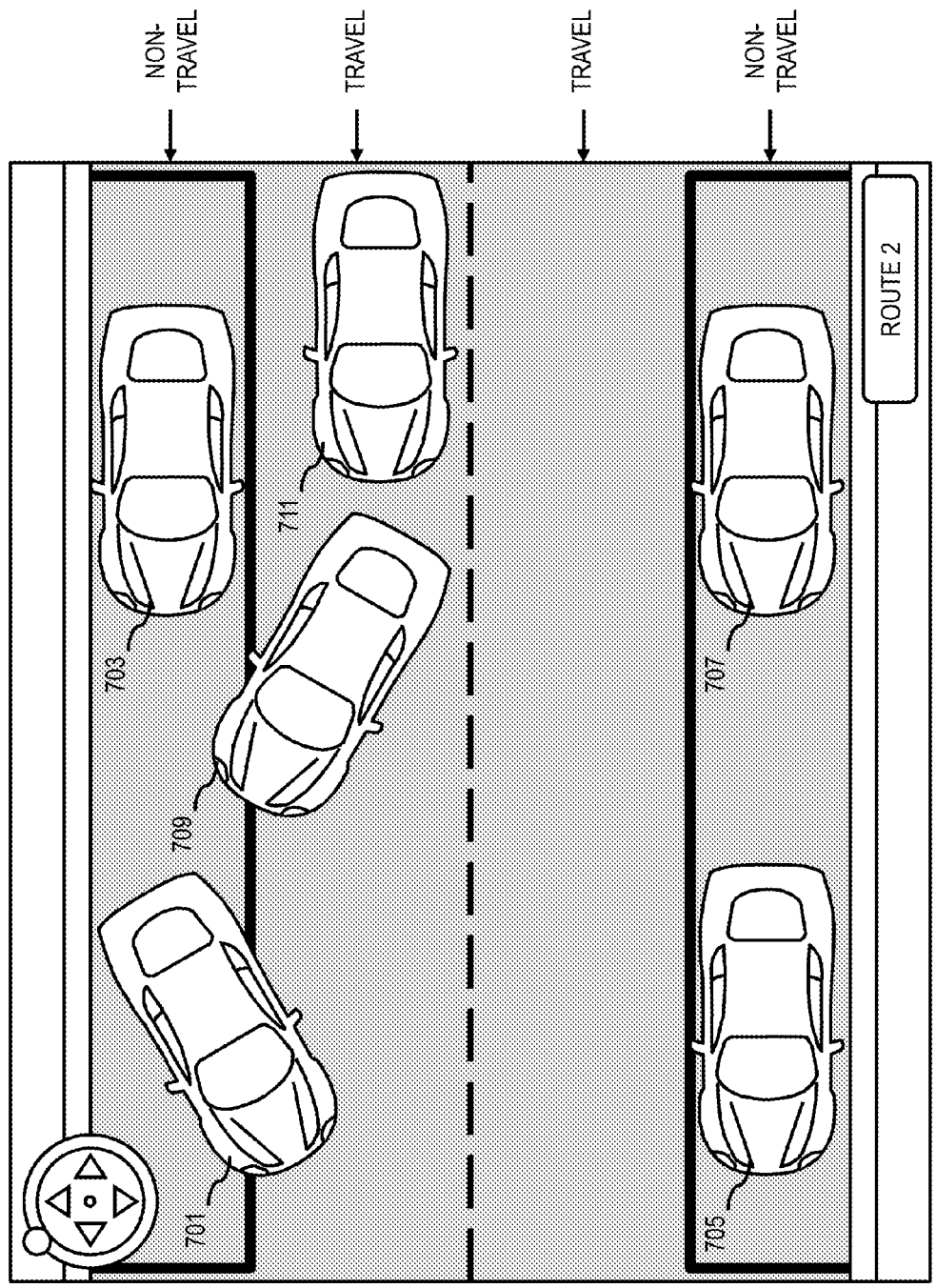

METHOD AND APPARATUS FOR ROUTE DETERMINATION BASED ON ONE OR MORE NON-TRAVEL LANES

BACKGROUND

Service providers and device manufacturers (e.g., wireless, cellular, etc.) are continually challenged to deliver value and convenience to consumers by, for example, providing compelling network services. One area of interest has been the development of mapping and/or navigation applications that provide users of mobile devices with driving assistance services (e.g., route guidance) to improve the quality of their travels. However, there are traditionally many factors that can affect the quality of routing and guidance instructions generated by driving assistance services. For example, congestion caused by the presence of non-travel lanes (e.g., parking lanes, loading lanes, restricted lanes, etc.), particularly in urban areas, can potentially affect travel through those areas. Accordingly, service providers and device manufacturers face significant technical challenges in providing a navigation service that takes into account the presence of non-travel lanes when determining navigation routes.

SOME EXAMPLE EMBODIMENTS

Therefore, there is a need for an approach for determining whether to include the at least one route segment in a navigation route based, at least in part, on a minimization of a risk of being blocked by the one or more non-travel lanes.

According to one embodiment, a method comprises determining one or more non-travel lanes in at least one route segment. The method also comprises determining whether to include the at least one route segment in a navigation route based, at least in part, on a minimization of a risk of being blocked by the one or more non-travel lanes.

According to another embodiment, an apparatus comprises at least one processor, and at least one memory including computer program code for one or more computer programs, the at least one memory and the computer program code configured to, with the at least one processor, cause, at least in part, the apparatus to determine one or more non-travel lanes in at least one route segment. The apparatus is also caused to determine one or more non-travel lanes in at least one route segment. The apparatus is further caused to determine whether to include the at least one route segment in a navigation route based, at least in part, on a minimization of a risk of being blocked by the one or more non-travel lanes.

According to another embodiment, a computer-readable storage medium carries one or more sequences of one or more instructions which, when executed by one or more processors, cause, at least in part, an apparatus to determine one or more non-travel lanes in at least one route segment. The apparatus is also caused to determine whether to include the at least one route segment in a navigation route based, at least in part, on a minimization of a risk of being blocked by the one or more non-travel lanes.

According to another embodiment, an apparatus comprises means for determining one or more non-travel lanes in at least one route segment. The apparatus also comprises means for determining whether to include the at least one route segment in a navigation route based, at least in part, on a minimization of a risk of being blocked by the one or more non-travel lanes.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 6A and 6B are diagrams that illustrate a problem faced by the users while travelling as a result of on-street parking utilized in the process of FIG. 3, according to various embodiments;

FIGS. 7A and 7B are diagrams of user interfaces utilized in the processes of FIG. 3, according to various embodiments;

DESCRIPTION OF SOME EMBODIMENTS

Examples of a method, apparatus, and computer program for determining whether to include the at least one route segment in a navigation route based, at least in part, on a minimization of a risk of being blocked by the one or more non-travel lanes are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1A:
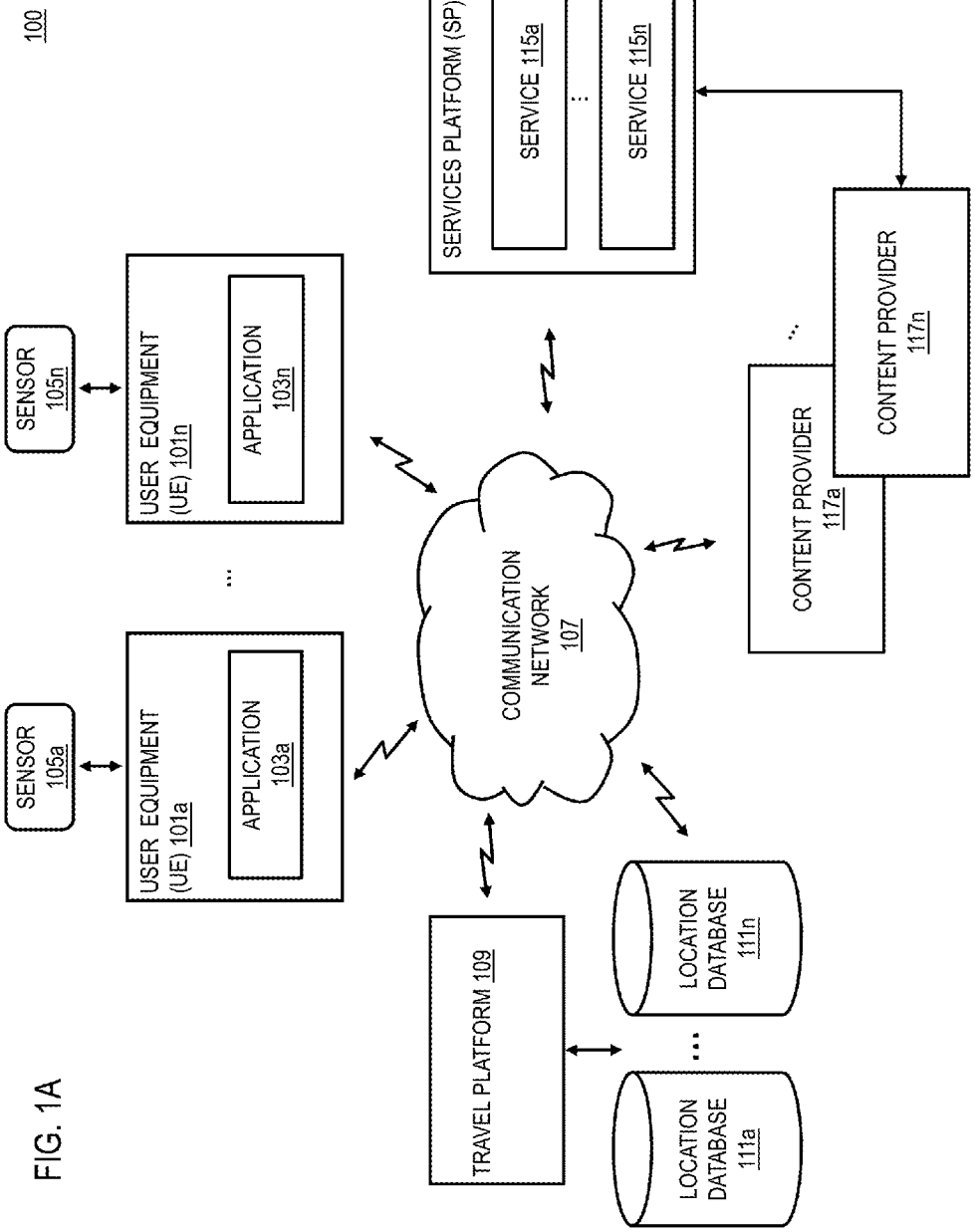
FIG. 1A is a diagram of a system capable of determining whether to include the at least one route segment in a navigation route based, at least in part, on a minimization of a risk of being blocked by the one or more non-travel lanes, according to one embodiment.

FIG. 1A is a diagram of a system capable of determining whether to include the at least one route segment in a navigation route based, at least in part, on a minimization of a risk of being blocked by the one or more non-travel lanes, according to one embodiment. As mentioned, there often can be a risk of a user encountering congestion when traveling on streets or routes that have non-travel lanes (e.g., parking lanes, loading lanes, restricted lanes, etc.) adjoining travel lanes. For example, in urban areas where streets may have parking lanes on, a user faces an increased risk of being block or slowed down by other vehicles attempting to park in the parking lanes in front of the user. The same situation may apply if there are other non-travel lanes along the street. For example, if there are loading lanes, work vehicles have the potential to block and slow traffic down. In another example, the presence of bicycle lanes may increase the potential for traffic slow as bicyclists exit or enter the lanes in front of the users. As a result, such non-travel lanes have the potential to adversely affect travel for users, thereby resulting in increased travel time and less efficient routing for users.

To address this problem, a system 100 of FIG. 1 introduces the capability to calculate better navigation routes by considering when non-travel lanes are present on the potential navigation routes. More specifically, the system 100 determines one or more non-travel lanes in at least one route segment. The system 100 may further determine whether to include the at least one route segment in a navigation route based, at least in part, on the determined one or more non-travel lanes included in the navigation route. In one embodiment, the system 100 provides one or more routing algorithms that enable drivers to reduce the risk of being delayed or stuck on a street because another driver is trying enter or exit the non-travel lanes in from of them. The system 100, for instance, can take the number of non-travel lanes into account when making routing calculations. In another embodiment, the system 100 can also take into account the number of travel lanes in relation to the number of non-travel lanes when calculating navigation routes. For example, the system 100 may consider the number of driving lanes available for a road segment. The system 100 then adjusts the weighting/penalty for each segment based on the ratio of non-travel lanes to the travel lanes.

In one use scenario, the system 100 may be evaluating whether to route a user along Street A versus Street B. In this example, Street A has one travel lane and one non-travel lane (e.g., one parking lane on the left hand side), whereas Street B has one travel lane and two non-travel lanes (e.g., one parking lane on each side of the street). In one embodiment, the system 100 can favor Street A in routing calculations because Street A has a fewer number of non-travel lanes when compared to Street B. Accordingly, by routing the user along Street A, the system 100 reduces the risk that the user will encountered congestion resulting from drivers entering or exiting the non-travel lanes (e.g., parking lanes). It is noted that although various embodiments discuss non-travel lanes with respect to parking lanes, it is contemplated that non-travel lanes refers to any lane on which a user is not permitted to travel. For example, non-travel lanes include, but are not limited to, one or more parking lanes, one or more pedestrian lanes, one or more bicycling lanes, one or more public transportation lanes, one or more loading lanes, one or more restricted lanes, or a combination thereof.

According to one embodiment, the system 100 may initially determine one or more route segment that are already correlated with one or more non-travel lanes based, at least in part, on location information contained within one or more location databases 111a-111n (collectively referred to as location database 111), available from one or more mapping and/or navigation services, or a combination thereof. In one embodiment, the system 100 may determine the one or more travel lanes for the determined route segment based, at least in part, on location information contained within the location database 111. Then, the system 100 may compare the determined non-travel lanes and travel lanes to determine the most suitable navigation routes for the user to reach his/her destination. Subsequently, system 100 may recommend a route based on such comparison.

As shown in FIG. 1, the system 100 comprises user equipment (UE) 101a-101n (collectively referred to as UE 101) that may include or be associated with applications 103a-103n (collectively referred to as applications 103) and sensors 105a-105n (collectively referred to as sensors 105). In one embodiment, the UE 101 has connectivity to the travel platform 109 via the communication network 107. In one embodiment, the travel platform 109 performs one or more functions associated with determining at least one suitable navigation route for the at least one user based, at least in part, on the comparison between the one or more non-travel lanes to the one or more travel lanes.

By way of example, the UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the applications 103 may be any type of application that is executable at the UE 101, such as media player applications, social networking applications, calendar applications, content provisioning services, location-based service applications, navigation applications and the like. In one embodiment, one of the applications 103 at the UE 101 may act as a client for the travel platform 109 and perform one or more functions associated with the functions of the travel platform 109 by interacting with the travel platform 109 over communication network 107.

By way of example, the sensors 105 may be any type of sensor. In certain embodiments, the sensors 105 may include, for example, a global positioning sensor for gathering location data, a network detection sensor for detecting wireless signals or network data, temporal information, a camera/imaging sensor for gathering image data, an audio recorder for gathering audio data, and the like. In one scenario, the sensors 105 may include location sensors (e.g., GPS), light sensors, oriental sensors augmented with height sensor and acceleration sensor, tilt sensors, moisture sensors, pressure sensors, audio sensors (e.g., microphone), or receivers for different short-range communications (e.g., Bluetooth, WiFi, near field communication etc.).

The communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), peer to per (P2P) etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

In one embodiment, the travel platform 109 may be a platform with multiple interconnected components. The travel platform 109 may include multiple servers, intelligent networking devices, computing devices, components and corresponding software for determining at least one suitable route segment for at least one navigation route based, at least in part, on a minimization of a risk of being blocked by the one or more non-travel lanes. In addition, it is noted that the travel platform 109 may be a separate entity of the system 100, a part of the one or more services 115 of the services platform 113, or included within the UE 101 (e.g., as part of the applications 103).

By way of example, when a user plans a trip to the one or more destinations, he/she may enter the name or address of the one or more destinations into a navigation application. The travel platform 109 may query the one or more non-travel lanes, one or more travel lanes, associated with the determined route segment. Then, the travel platform 109 may determine at least one ratio of the number of the one or more non-travel lanes to another number of one or more travel lanes in the at least one route segment. Further, the travel platform 109 may determine a probability of obstructed travel through the at least one route segment resulting from vehicle movement between the one or more non-travel lanes and the one or more travel lanes. In one scenario, the travel platform 109 may determine one or more travel destinations for the at least one user, whereby the travel platform 109 may process and/or facilitate a processing of the location information to determine one or more non-traffic lanes and/or one or more traffic lanes associated with a determined route segment. Then, the travel platform 109 may cause a comparison between the one or more non-traffic lanes and the one or more traffic lanes to recommend at least one route segment to be included in a navigation route. In one scenario, the travel platform 109 may cause a ranking of the one or more determined route segments based, at least in part, on the comparison, and may attach weighting values, for example, causing, at least in part, a penalty for one or more routes segment based, at least in part, on one or more non-travel lanes, one or more travel lanes, or a combination thereof.

In one embodiment, the location database 111 may include one or more contexts, one or more parameters, or a combination thereof associated with one or more non-travel lanes and/or one or more travel lanes in at least one route segment. By way of example, the travel platform 109 may use the one or more contexts, the one or more parameters, or a combination thereof stored within the location database 111 to determine one or more relationships between the one or more non-travel lanes and/or one or more travel lanes associated with at least one route segment. More specifically, the travel platform 109 may use the one or more contexts, the one or more parameters, or a combination thereof to determine a hierarchy (e.g., ratio of one or more non-travel lanes to one or more travel lanes) in at least one route segment. In one embodiment, the travel platform 109 may utilize location-based technologies (GPS receivers, cellular triangulation, A-GPS, etc.) to determine location and temporal information for one or more destinations for the one or more UE 101.

The services platform 113 may include any type of service. By way of example, the services platform 113 may include mapping services, navigation services, travel planning services, social networking services, content (e.g., audio, video, images, etc.) provisioning services, application services, storage services, contextual information determination services, location based services, information (e.g., weather, news, etc.) based services, etc. In one embodiment, the services platform 113 may interact with the UE 101, the travel platform 109 and the content providers 117 to supplement or aid in the processing of the content information. In one embodiment, the travel platform 109 and the services platform 113 may also run in UE 101.

By way of example, services 115 may be an online service that reflects interests and/or activities of users. In one scenario, the services 115 provide representations of each user (e.g., a profile), his/her social links, and a variety of additional information. The services 115 allow users to share location information, activities information, contextual information, historical user information and interests within their individual networks, and provides for data portability. The services 115 may additionally assist in providing the travel platform 109 with travel information of the one or more geo-routes and/or location anchors, etc.

The content providers 117 may provide content to the UE 101, the travel platform 109, and the services 115 of the services platform 113. The content provided may be any type of content, such as textual content, audio content, video content, image content, etc. In one embodiment, the content providers 117 may provide content that may supplement content of the applications 103, the sensors 105, or a combination thereof. By way of example, the content providers 117 may provide content that may aid in determining the most suitable route segment in a navigation route for at least one user. In one embodiment, the content providers 117 may also store content associated with the UE 101, the travel platform 109, and the services 115 of the services platform 113. In another embodiment, the content providers 117 may manage access to a central repository of data, and offer a consistent, standard interface to data, such as a repository of users' navigational data content.

By way of example, the UE 101, the travel platform 109, the services platform 113, and the content providers 117 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 1B:
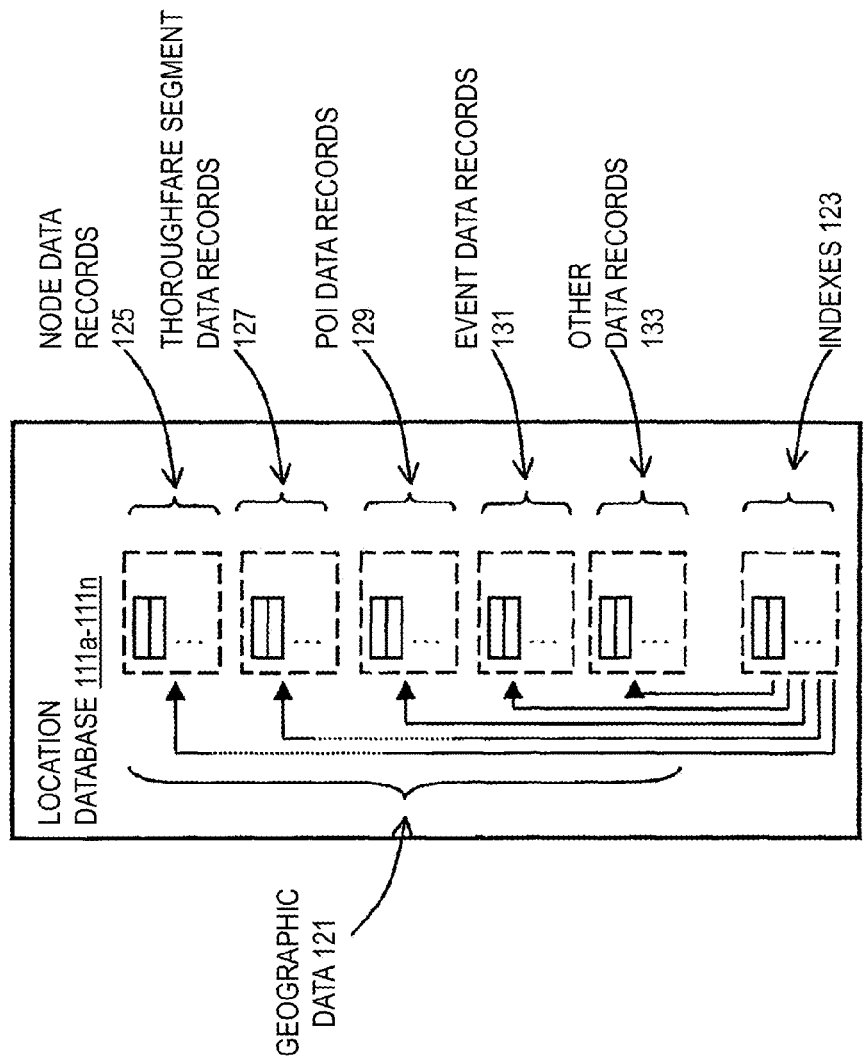
FIG. 1B is a diagram of a location database, such as can be included in the system of FIG. 1A, according to one embodiment.

FIG. 1B is a diagram of location database 111 of system 100, according to exemplary embodiments. In the exemplary embodiments, mapping data can be stored, associated with, and/or linked to the location database 111. In one embodiment, the location database 111 includes geographic data 121 used for (or configured to be compiled to be used for) mapping and/or navigation-related services, such as for personalized route determination, according to exemplary embodiments. In one embodiment, the location database 111 may include one or more indexes 123 for indexing the geographic data 121. By way of example, the location database 111 includes node data records 125, thoroughfare segment or link data records 127, POI data records 129, travel/non-travel lane records 131, and other data records 133. More, fewer or different data records can be provided. In one embodiment, the other data records 133 include cartographic ("carto") data records, routing data, and maneuver data. One or more portions, components, areas, layers, features, text, symbols, names and/or a time of release of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. In one embodiment, the POI mapping platform 101 utilizes the name, location and a time of release of the POI data record for querying images of the POI from the image sharing services 115.

In exemplary embodiments, the thoroughfare segment data records 127 are links or segments representing roads, streets, or paths, as can be used in the calculated route or recorded route information for determination of one or more personalized routes, according to exemplary embodiments. The node data records 125 are end points corresponding to the respective links or segments of the thoroughfare segment data records 127. The thoroughfare segment data records 127 and the node data records 125 represent a thoroughfare network, such as used by vehicles and/or other entities (e.g., pedestrians, trains, planes, boats, etc.). Alternatively, the location database 111 can contain path segment and node data records or other data that represent pedestrian paths or areas in addition to or instead of the vehicle road record data, for example.

The thoroughfare/link segments and nodes can be associated with attributes, such as geographic coordinates, street names, address ranges, speed limits, turn restrictions at intersections, number travel lanes, number of non-travel lanes, types of non-travel lanes, and other navigation related attributes, as well as POIs, such as gasoline stations, hotels, restaurants, museums, stadiums, offices, automobile dealerships, auto repair shops, buildings, shopping stores, parks, etc. The location database 111 can include data about the POIs and their respective locations in the POI data records 129. The location database 111 can also include data about places, such as cities, towns, or other communities, and other geographic features, such as bodies of water, mountain ranges, etc. Such place or feature data can be part of the POI data records 129 or can be associated with POIs or POI data records 129 (such as a data point used for displaying or representing a position of a city). In addition, the location database 111 can include event data (e.g., traffic incidents, construction locations, scheduled events, unscheduled events, etc.) associated with the POI data records 129 or other records of the location database 111.

The location database 111 can be maintained by the content provider 117 in association with the services platform 113 and/or content providers 117 (e.g., a map developer). The map developer can collect geographic data to generate and enhance the location database 111. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The location database 111 can be a master location database stored in a format that facilitates updating, maintenance, and development. For example, the master location database 111 or data in the master location database 111 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form location database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a UE 101, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received location database in a delivery format to produce one or more compiled navigation databases.

As mentioned above, the location database 111 can be a master location database, but in alternate embodiments, the client side location database (not shown for illustrative convenience) can represent a compiled navigation database that can be used in or with end user devices (e.g., UEs 101) to provide navigation-related functions. For example, the client side location database can be used with the UE 101 to provide an end user with navigation features. In such a case, the client side location database can be downloaded or stored on the end user device UE 101, or the end user device UE 101 can access the location database 111 and/or the client side location database through a wireless or wired connection (such as via a server and/or the communication network 107), for example.

In one embodiment, the thoroughfare segment data records 127 may be associated with information related to the number travel lanes and/or non-travel lanes along a route segment. The travel/non-travel lane records 131 are then used to store data regarding the attributes or characteristics of the travel/non-travel lanes. For example, the attribute or characteristics may describe the physical dimensions of the lanes (e.g., width, length, etc.), vehicle capacity, applicable restrictions, hours of operation, etc. The system 100 can then process or take into account the travel/non-travel lanes and their attributes/characteristics when calculating navigation routes.

Figure 2:
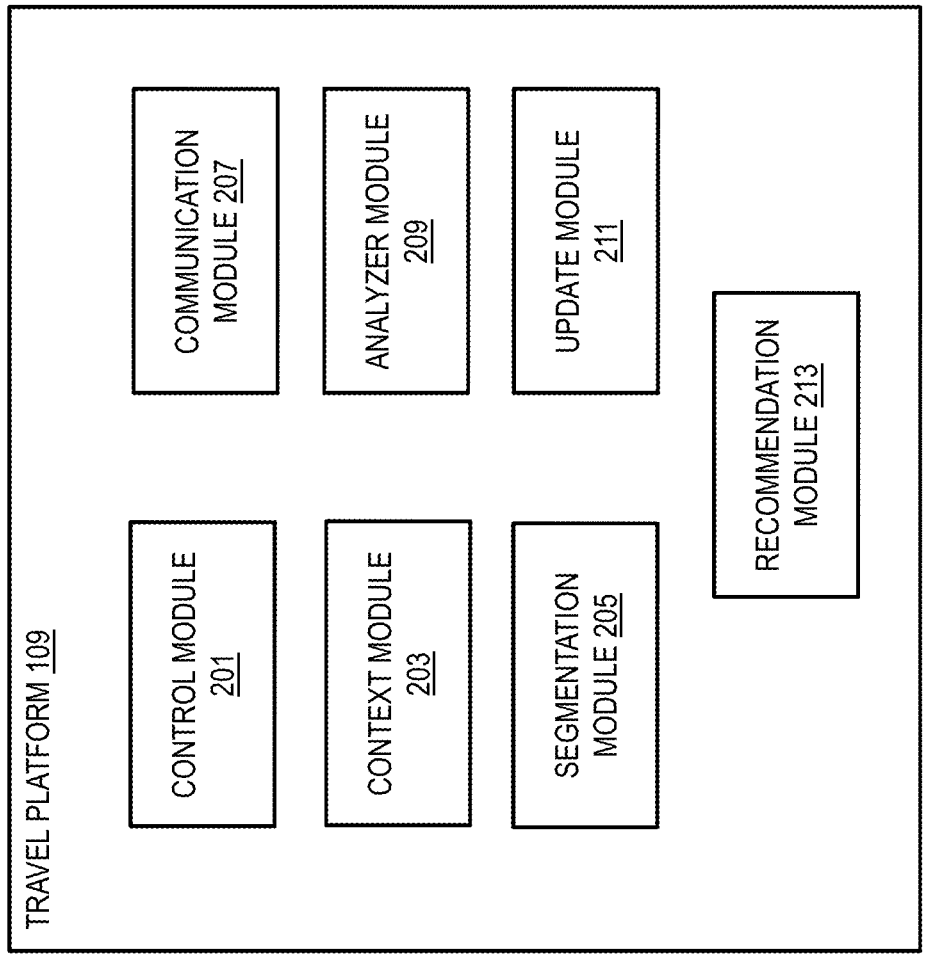
FIG. 2 is a diagram of the components of the travel platform 109, according to one embodiment.

FIG. 2 is a diagram of the components of the travel platform 109, according to one embodiment. By way of example, the travel platform 109 includes one or more components for determining at least one suitable route segment in a navigation route based, at least in part, on the on a minimization of a risk of being blocked by the one or more non-travel lanes. It is contemplated that the functions of these components may be combined in one or more components or performed by other components of equivalent functionality. In this embodiment, the travel platform 109 includes a control module 201, a context module 203, a segmentation module 205, a communication module 207, an analyzer module 209, an update module 211, and a recommendation module 213.

The control module 201 executes at least one algorithm for executing functions of the travel platform 109. For example, the control module 201 may execute an algorithm for processing a query associated with a UE 101 for determining suitable route information for at least one destination. By way of another example, the control module 201 may execute an algorithm to interact with the context module 203 to determine the geographic or temporal context of a UE 101. The control module 201 may execute an algorithm to interact with the segmentation module 205 to cause a segmentation of one or more travel paths to determine at least one driving segment based, at least in part, on the number of non-travel lanes, travel lanes, or a combination thereof. The control module 201 may also execute an algorithm to interact with the communication module 207 to communicate among applications 103, the travel platform 109, the services platform 113, the content providers 117, and the location database 111. The control module 201 may also execute an algorithm to interact with the analyzer module 209 to analyze one or more non-travel lanes, one or more travel lanes or a combination thereof.

The context module 203 may determine the geographic or temporal context of a UE 101 by utilizing location-based technologies (GPS receivers, cellular triangulation, A-GPS, etc.) to determine location (e.g., geographic coordinates) and temporal information (e.g., speed) regarding a UE 101 during one or more navigation route between a starting point of interest (e.g., a home or office) and one or more destination. The context module 203 may also identify whether certain conditions or triggers have been met, such as whether a particular event has occurred (e.g., initiation of a travel to one or more destination). The context module 203, in connection with the segmentation module 205, is also used to determine the one or more non-travel lanes, one or more travel lanes, associated with the determined route segment to one or more destinations. Further, the context module 203 may determine to store the one or more travel paths, the one or more non-travel lanes, and/or the one or more travel lanes within the location database 111.

The segmentation module 205 segments one or more routes to determine at least one suitable driving segment. In one embodiment, the segmentation module 205 may determine a route from a start point to a destination point ensuring minimization of obstruction by processing one or more non-travel lanes, one or more travel lanes, or a combination thereof. By way of example, if one of the selected streets associated with a determined route segment is ascertained to be congested during the time the user is to pass through, the segmentation module 205 can select an alternative route and amend the navigation route to ensure minimal traffic congestion for the user without any blocking by passing vehicles. In one scenario, the segmentation module 205 may determine certain non-travel lanes have vacant spaces, thereby the travel platform 109 may guide vehicles looking for parking towards the determined vacant space. On the other hand, the travel platform 109 may determine vehicles intending to only drive through a street, whereby the travel platform may guide the vehicles through a street where all the parking slots are full, and the probability of passing vehicle obstructing the passage of the driving vehicles is minimal.

The communication module 207 is used for communication between the applications 103, the travel platform 109, the services platform 113, the content providers 117, and the location database 111. The communication module 207 may be used to communicate commands, requests, data, etc. By way of example, the communication module 207 may be used to transit a request from a user interface (UI) of a UE 101 to obtain location-based information (e.g., route information) for one or more destinations. In one embodiment, the communication module 207 is used to present a user with location-based information obtained from the location database 111 regarding one or more route information associated with one or more destinations. By way of example, if location-based information related to one or more destination is unavailable from the location database 111, the communication module 207, in connection with the segmentation module 205 and the analyzer module 209, can be used to transmit the location-based information to the location database 111 for future reference.

The analyzer module 209 is used to process one or more determined routes before and/or during one or more travel paths between a starting point of interest (e.g., a home or office) and one or more destinations (e.g., a restaurant, a stadium, etc.). The analyzer module 209 then analyzes the one or more non-travel lanes, one or more travel lanes, or a combination thereof, with one or more determined route to the one or more destination.

The update module 211 may work with the context module 203 and the recommendation module 213 to cause, at least in part, an update of the at least one routing information periodically, according to a schedule, on demand, or a combination thereof for a predetermined period prior to and/or during and/or after a commencement of travel.

In addition, the context module 203 may work with the recommendation module 213 to generate a recommendation to a user of at least one alternate route based, at least in part, on travel information obtained by the context module 203 for a predetermined period prior to, during, or after a user's commencement of travel. In particular, the context module 203 and the recommendation module 213 may work together in order to monitor location information while traveling to the one or more destinations.

Figure 3:
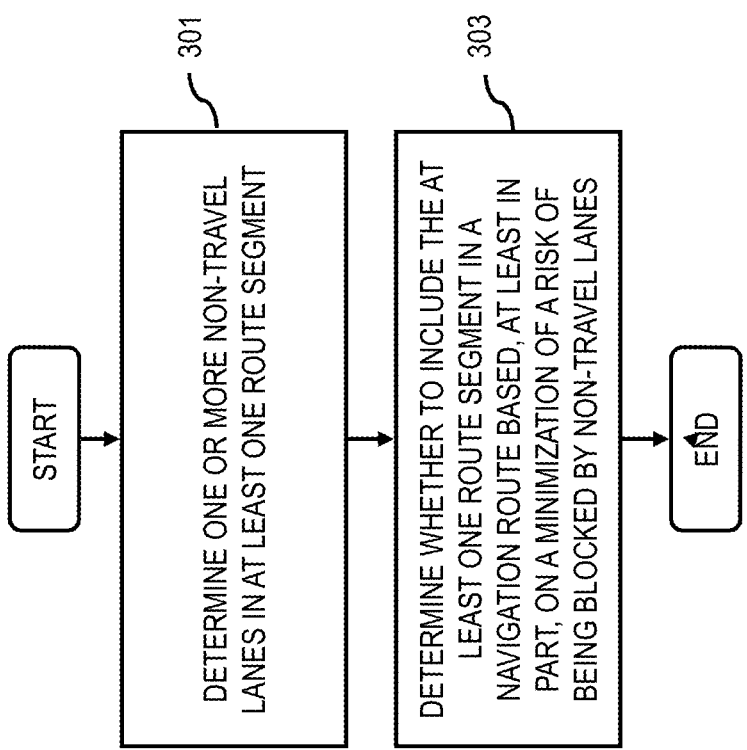
FIG. 3 is a flowchart of a process for selecting at least one route segment in a navigation route based, at least in part, on the determined one or more non-travel lanes, according to one embodiment.
Figure 10:
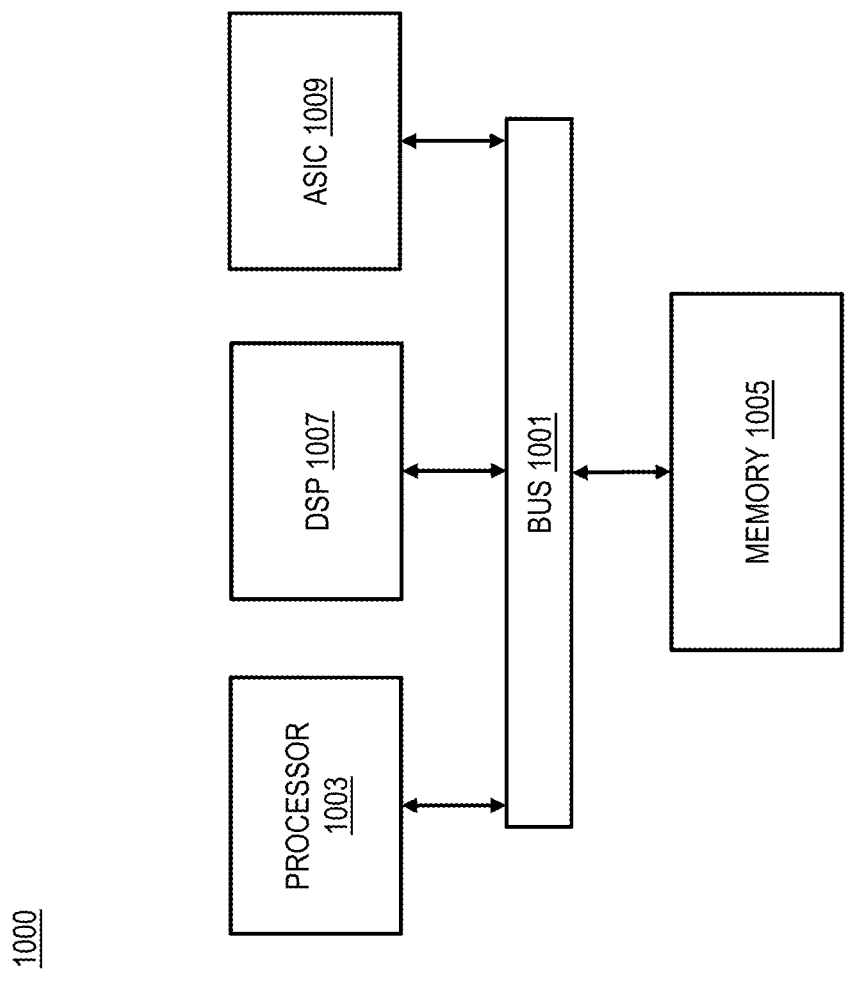
FIG. 10 is a diagram of a chip set that can be used to implement an embodiment of the invention.

FIG. 3 is a flowchart of a process for selecting at least one route segment in a navigation route based, at least in part, on a minimization of a risk of being blocked by one or more non-travel lanes, according to one embodiment. In one embodiment, the travel platform 109 performs the process 300 and is implemented in, for instance, a chip set including a processor and a memory as shown in FIG. 10.

In step 301, the travel platform 109 may determine one or more non-travel lanes in at least one route segment, wherein the one or more non-travel lanes include, at least in part, one or more parking lanes, one or more pedestrian lanes, one or more bicycling lanes, one or more public transportation lanes, one or more loading lanes, one or more restricted lanes, or a combination thereof. In one scenario, the travel platform 109 may determine one or more travel destinations for the at least one user, whereby the travel platform 109 may process the location information to determine one or more non-travel lanes, one or more travel lanes, or a combination thereof. In one scenario, the location information may include, at least in part, mapping information, route information, navigation information or a combination thereof.

In step 303, the travel platform 109 may determine whether to include the at least one route segment in a navigation route based, at least in part, on a minimization of a risk of being blocked by the one or more non-travel lanes. In one scenario, the travel platform 109 may cause, at least in part, a comparison of one or more non-travel lanes to the one or more travel lanes within a route segment. In one scenario, the travel platform 109 may cause, at least in part, a comparison of one or more non-travel lanes and/or the one or more travel lanes between the one or more route segments. The travel platform 109 may cause, at least in part, a recommendation of at least one route segment to be included in the navigation route based, at least in part, on the comparison. In one scenario, the comparison may further be in terms of the width of the one or more non-travel lanes and/or travel lanes, the length of the one or more non-travel lanes and/or travel lanes, the density in the one or more non-travel lanes and/or travel lanes, or a combination thereof.

Figure 4:
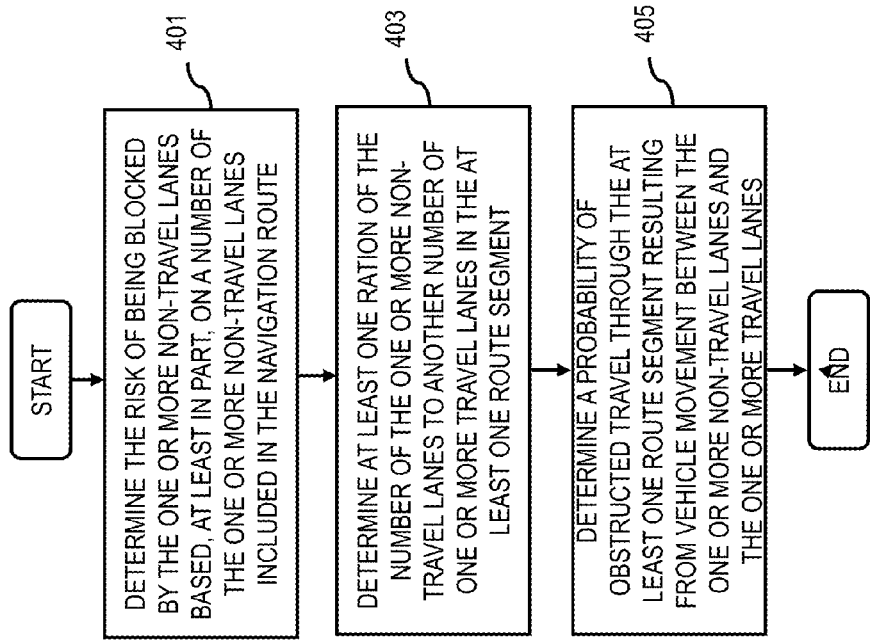
FIG. 4 is a flowchart of a process for determining a probability of an obstruction in at least on route segment based, at least in part, on a ratio of the number of non-travel lanes to the number of travel lanes, according to one embodiment.

FIG. 4 is a flowchart of a process for determining a probability of an obstruction in at least on route segment based, at least in part, on a ratio of the number of non-travel lanes to the number of travel lanes, according to one embodiment. In one embodiment, the travel platform 109 performs the process 400 and is implemented in, for instance, a chip set including a processor and a memory as shown in FIG. 10.

In step 401, the travel platform 109 may determine the risk of being blocked by the one or more non-travel lanes based, at least in part, on a number of the one or more non-travel lanes included in the navigation route. In one scenario, the travel platform 109 may determine that route segment XYZ has two parking lanes, two public transportation lanes and two loading lanes, whilst the route segment ABC has one parking lane, one biking lane and one pedestrian lane. Therefore, the travel platform 109 may determine that the possibility of being blocked in route segment XYZ is higher than in route segment ABC, accordingly travel platform 109 may recommend route segment ABC to one or more user driving to at least one destination. In one scenario, the travel platform 109 may take into consideration the length and/or the width of the one or more non-travel lanes.

In step 403, the travel platform 109 may determine at least one ratio of the number of the one or more non-travel lanes to another number of one or more travel lanes in the at least one route segment, wherein (a) the determination of whether to include the at least one route segment in the navigation route, (b) the minimization of the risk of being blocked, or (c) a combination thereof is based, at least in part, on the at least one ratio. In one scenario, the travel platform 109 may determine one or more weighting values for one or more routes, wherein the weighing values may include penalties for the number of one or more non-travel lanes. In one scenario, the travel platform 109 may compare the number of the one or more non-travel lanes to another number of one or more travel lanes in the at least one route segment. Further, the travel platform 109 may cause, at least in part, a ranking of one or more routes based, at least in part, on the comparison.

In step 405, the travel platform 109 may determine a probability of obstructed travel through the at least one route segment resulting from vehicle movement between the one or more non-travel lanes and the one or more travel lanes, wherein (a) the determination of whether to include the at least one route segment in the navigation route, (b) the minimization of the risk of being blocked, or (c) a combination thereof is further based, at least in part, on the probability. In one embodiment, the probability of obstructed travel and/or the risk of being blocked are determined based, at least in part, on historical information, current information, or a combination thereof. In one scenario, the travel platform 109 may determine weighting values based, at least in part, on anticipated parking of one or more other vehicles in the determined non-travel lane. In one scenario, the travel platform 109 may cause, at least in part, a monitoring of one or more non-travel lanes continuously, periodically, according to a schedule, on demand, or a combination thereof, to determine the available parking spaces in the non-travel lanes of the determined route segment, whereby the travel platform 109 may guide a travelling vehicle through a route segment where all the parking spaces in the non-travel lanes are occupied, ensuring minimal traffic interruption for the user during his/her travel.

Figure 5:
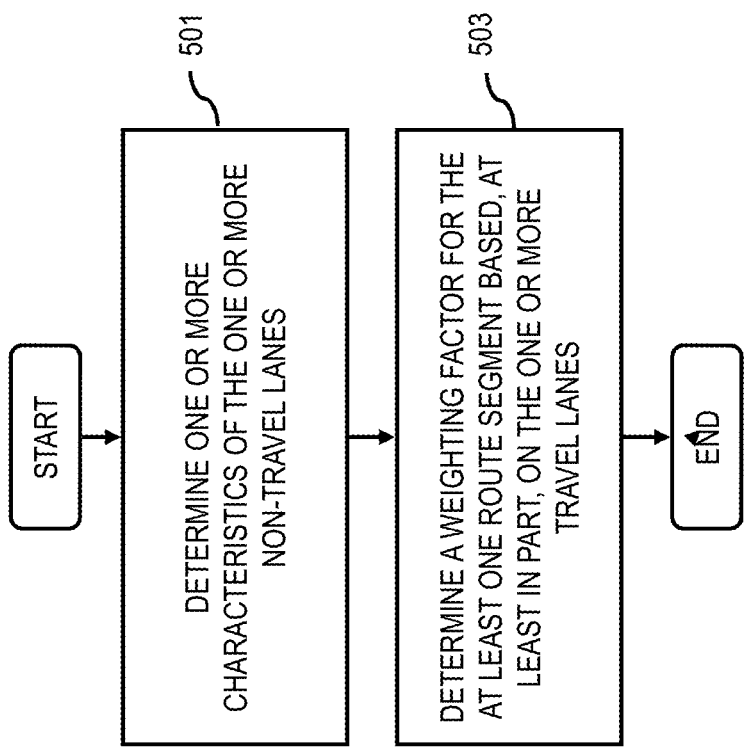
FIG. 5 is a flowchart of a process for determining a weighing factor for at least one route segment based, at least in part, on one or more characteristics of a non-travel lane, according to one embodiment.

FIG. 5 is a flowchart of a process for determining a weighing factor for at least one route segment based, at least in part, on one or more characteristics of a non-travel lane, according to one embodiment. In one embodiment, the travel platform 109 performs the process 500 and is implemented in, for instance, a chip set including a processor and a memory as shown in FIG. 10.

In step 501, the travel platform 109 may determine one or more characteristics of the one or more non-travel lanes, wherein (a) the determination of whether to include the at least one route segment in the navigation route, (b) the minimization of the risk of being blocked, or (c) a combination thereof is based, at least in part, on the one or more characteristics. In one embodiment, the one or more characteristics include physical dimension information. In one scenario, the travel platform 109 may further determine whether to include one or more route segment in a navigation route based, at least in part, on the length and width of the one or more non-travel lane, one or more travel lane, or a combination thereof In one scenario, the travel platform 109 may determine a navigation route by taking into account the number of parking lanes and the number of driving lanes in a road segment. Subsequently, the travel platform 109 may adjust a penalty for each road segment based on the ratio of number of parking lane over the number of driving lane.

In step 503, the travel platform 109 may determine a weighting factor for the at least one route segment based, at least in part, on the one or more travel lanes, wherein (a) the determination of whether to include the at least one route segment in the navigation route, (b) the minimization of the risk of being blocked, or (c) a combination thereof is based, at least in part, on the weighting factor. In one scenario, the travel platform 109 may determine to include a route segment in the navigation route based, at least in part, on a determination that the route segment has fewer non-travel lanes compared to the other route segments. In one scenario, the travel platform 109 may determine the number and/or the length and/or the width of non-travel lanes. Then, the travel platform 109 may select a route segment based, at least in part, on the determination, to minimize the risk of obstruction during travel to one or more destinations.

Figure 6A:
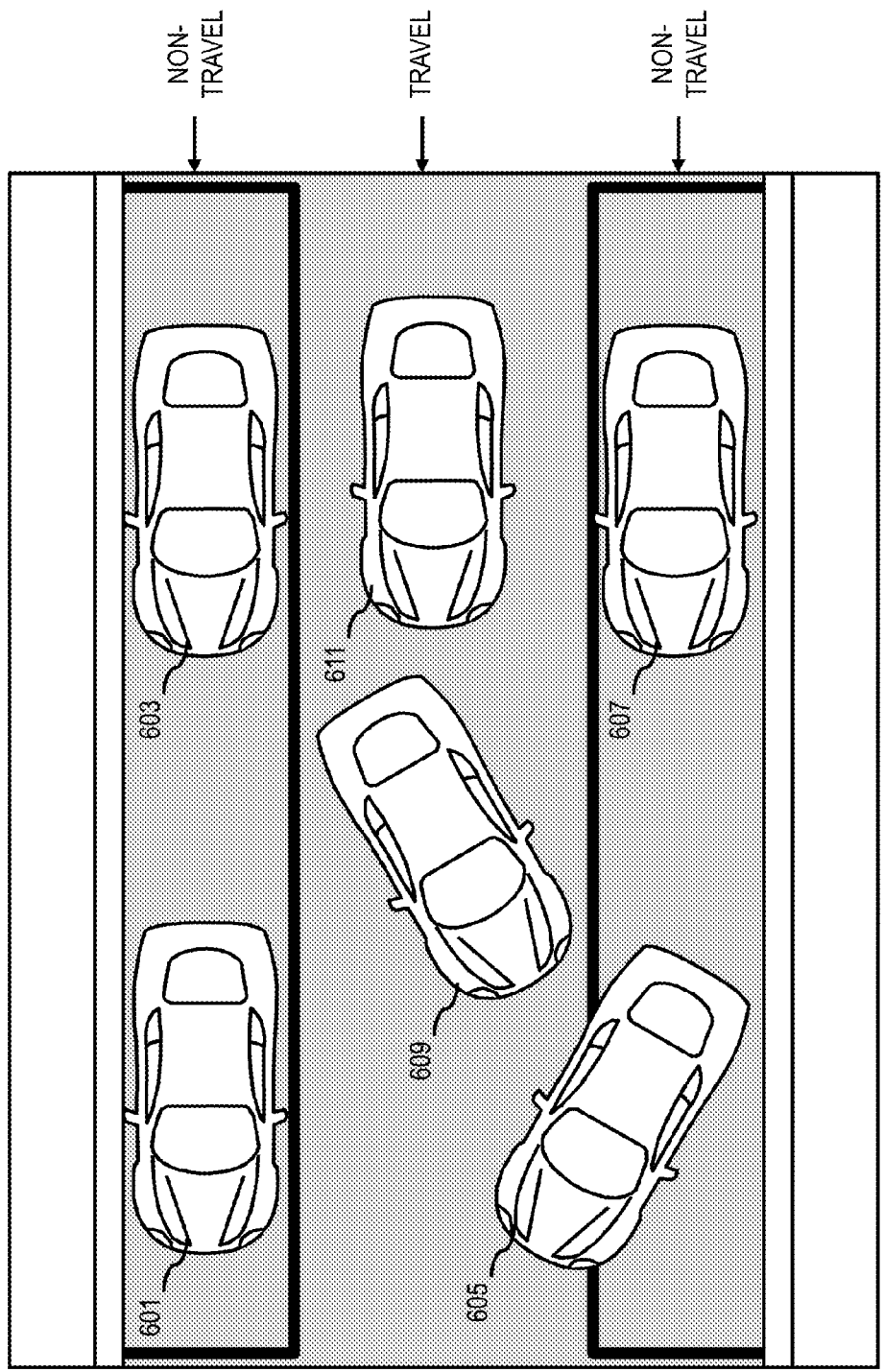

FIGS. 6A and 6B are diagrams that illustrate a problem faced by users while travelling as a result of on-street parking utilized in the process of FIGS. 3, according to various embodiments. In FIG. 6A, a user of vehicle 611 is navigated through a route to reach his/her destination, whereby the user comes across a street with single driving lane with parking on both sides, vehicles 601 and 603 are parked on the right hand side and vehicle 605 and 607 are parked on the left hand sides. The vehicle of the user is blocked by vehicle 609 attempting to park at a parking space upon departure of the vehicle 605. The available option for the owner of the vehicle 611 is to either request the respective drivers of the blocking vehicle 609 to move his/her vehicle or wait for the blocking vehicle to be properly parked. This process is time consuming and substandard especially in a situation when the users of the blocked vehicles are travelling in time constraint. In one embodiment, the travel platform 109 acknowledges that unsystematic parking by vehicles leads to other vehicle being blocked, therefore the travel platform 109 assists the users in reducing the risk of being stuck in a street by finding a suitable route where the chances of user's vehicle being blocked is very minimal. As a result, in FIG. 6B, the user of vehicle 619 may be navigated through a single lane parking (vehicles 613, 615 and 617 are parked on the left hand side of the street) to minimize blocking of the vehicle by the parking vehicles and/or the departing vehicle from the non-travel lane. The travel platform 109 by taking into account the number of non-travel lanes and/or the number of travel lanes in a street, and may provide the users with routing information to reduce the risk of being stuck in a street. In one scenario, the UE 101 may display alternative routes (626) to the user to reach a destination, where route 1 leads to a road with single parking lane and route 2 leads to a road with double parking lane. The travel platform 109 may then recommend a street to the user based on the determined probability of obstruction. In one embodiment, the travel platform 109 may take into consideration the density of the point of interest (POI) in a street while determining at least one route segment. In one scenario, the travel platform 109 may determine the probability of obstructed travel through the at least one route segment wherein the streets have numerous POIs. In one scenario, the travel platform 109 may determine that numerous POIs (e.g. 621, 623, 625) in one street segment may pose higher risk for vehicle 619 of being obstructed in traffic resulting from incoming/outgoing vehicles (627, 629) from at least one POIs etc.

Figure 7B:
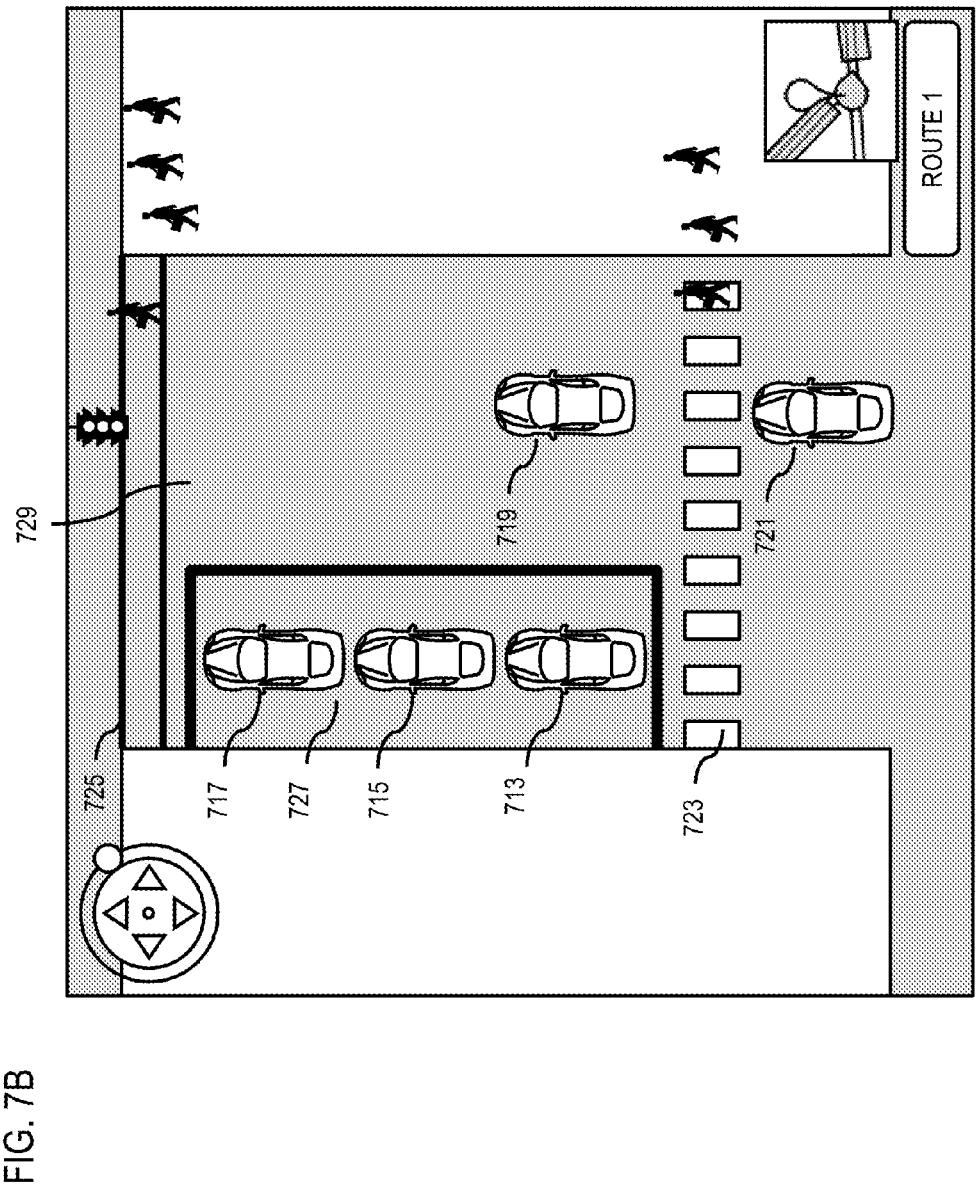

FIGS. 7A and 7B are diagrams of user interfaces utilized in the processes of FIG. 3, according to various embodiments. In one scenario, the travel platform 109 may determine a route by taking into account the number of non-travel lanes together with the number of travel lanes in one or more roads associated with a determined route segment. In one scenario, the travel platform 109 may process the length and the width of a road, the width of the travel lanes, the width of the one or more vehicles, or a combination thereof, to further filter the most suitable route segment for the at least one user. In FIG. 7A a user of vehicle 711 is navigated through a wide road with two driving lanes with parking on both sides of the road (vehicles 701 and 703 are parked on the right hand side and vehicle 705 and 707 are parked on the left hand sides). The vehicle of the user is then blocked by vehicles 709 attempting to park at a parking space upon departure of the vehicle 701. The available option for the owner of the vehicle 711 is to either wait for the blocking vehicle 709 to clear the path or utilize the available space in the road and proceed forward with his/her travel. The travel platform 109 may determine that the probability of obstruction during travel through a wide road with two driving lanes with parking on both sides may be less compared to a narrow road with single driving lane with parking on both sides. In FIG. 7B a user of vehicle 721 is navigated through a wide single lane road (729) with parking on the left hand side (727) of the road where vehicles 713, 715 and 717 are parked. Then, vehicle 721 is momentarily obstructed by vehicle 719 attempting to park at the parking space upon departure of the vehicle 717. However, vehicle 721 can utilize the available space and proceed forward with his/her travel. Here, the travel platform 109 may process the width of the travel lane 729 and the width of the user's vehicle 721 and may reach a determination that the vehicle can pass through the available space between the blocking vehicle. In one embodiment, the travel platform 109 may recommend travel routes with single lane parking over double lanes parking, because the risk of being obstructed by entering or leaving vehicles in double lane parking routes is higher. In one embodiment, the number of pedestrian crossings in a street may be used as a weighing factor for the at least one route segment (723, 725). In one scenario, the travel platform 109 may determine the probability of obstructed travel through at least one route segment based, at least in part, on the number of pedestrian crossings, whereby the travel platform 109 may select streets with fewer pedestrian crossings. In one scenario, the travel platform 109 while determining a route segment for vehicle 721 may select a street with two pedestrian crossings (723, 725) over a street with five pedestrian crossings to minimize the risk of being blocked while the pedestrians are trying to cross the street.

Figure 8:
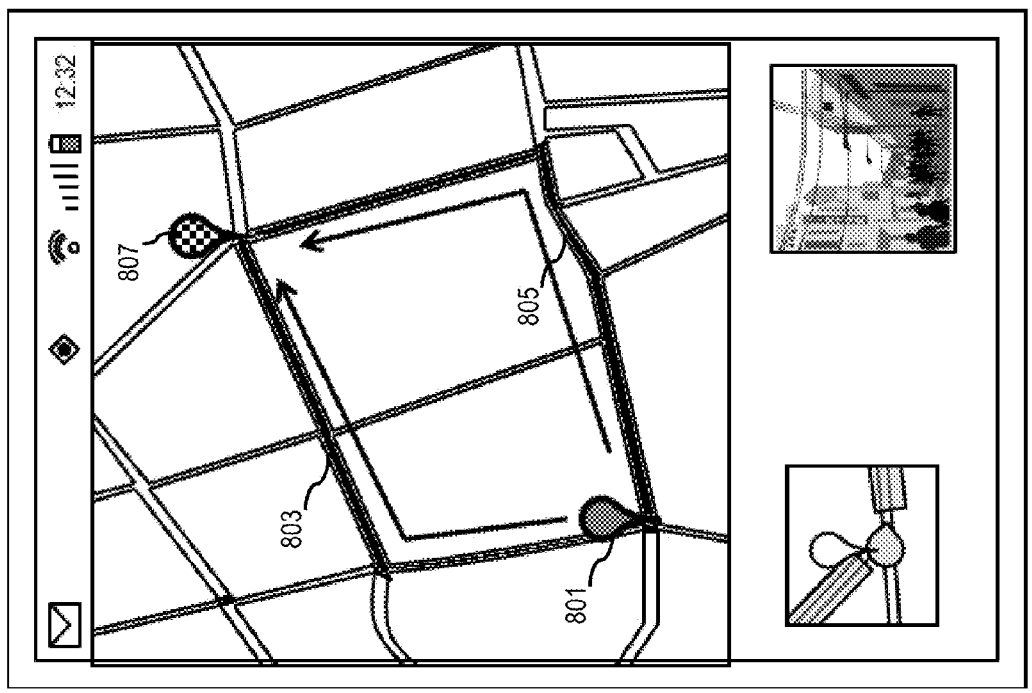
FIG. 8 is a diagram of user interface utilized in the processes of FIG. 3, according to one embodiment.

FIG. 8 is a diagram of user interface utilized in the processes of FIG. 3, according to one embodiment. In one scenario, when alternative routes are available to reach a destination, the travel platform 109 may prioritize the road segment which has less risk of being blocked by other vehicles considering the number of non-travel lanes available in the determined road segment. As illustrated in FIG. 8, a user is travelling from 801 to 807, and the travel platform 109 may display the user in his/her UE 101 available alternative routes to reach 807, whereby route segment 803 may comprise of narrow single lane road with parking on both sides, whilst route segment 805 may comprise of a wide double lane road with single lane parking. The travel platform 109 may recommend the most suitable route segment to the user based on the number of non-travel lanes, number of travel lanes, the length of the road, the width of the road, the width of the user's vehicle, the distance to the destination, and other attributes of a route segment. In one scenario, the travel platform 109 may determine that all non-travel lanes in a determined route segment are completely occupied, whereby the travel platform 109 may recommend the route segment for the vehicles intending to pass through the street to reach one or more destinations. In one scenario, the travel platform 109 may determine that a user is riding a motorcycle or a bicycle, whereby the user may be guided through a route segment upon determination that the motorcycle or the bicycle can easily pass through the blocking vehicle.

The processes described herein for determining whether to include the at least one route segment in a navigation route based, at least in part, on a minimization of a risk of being blocked by the one or more non-travel lanes may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 9:
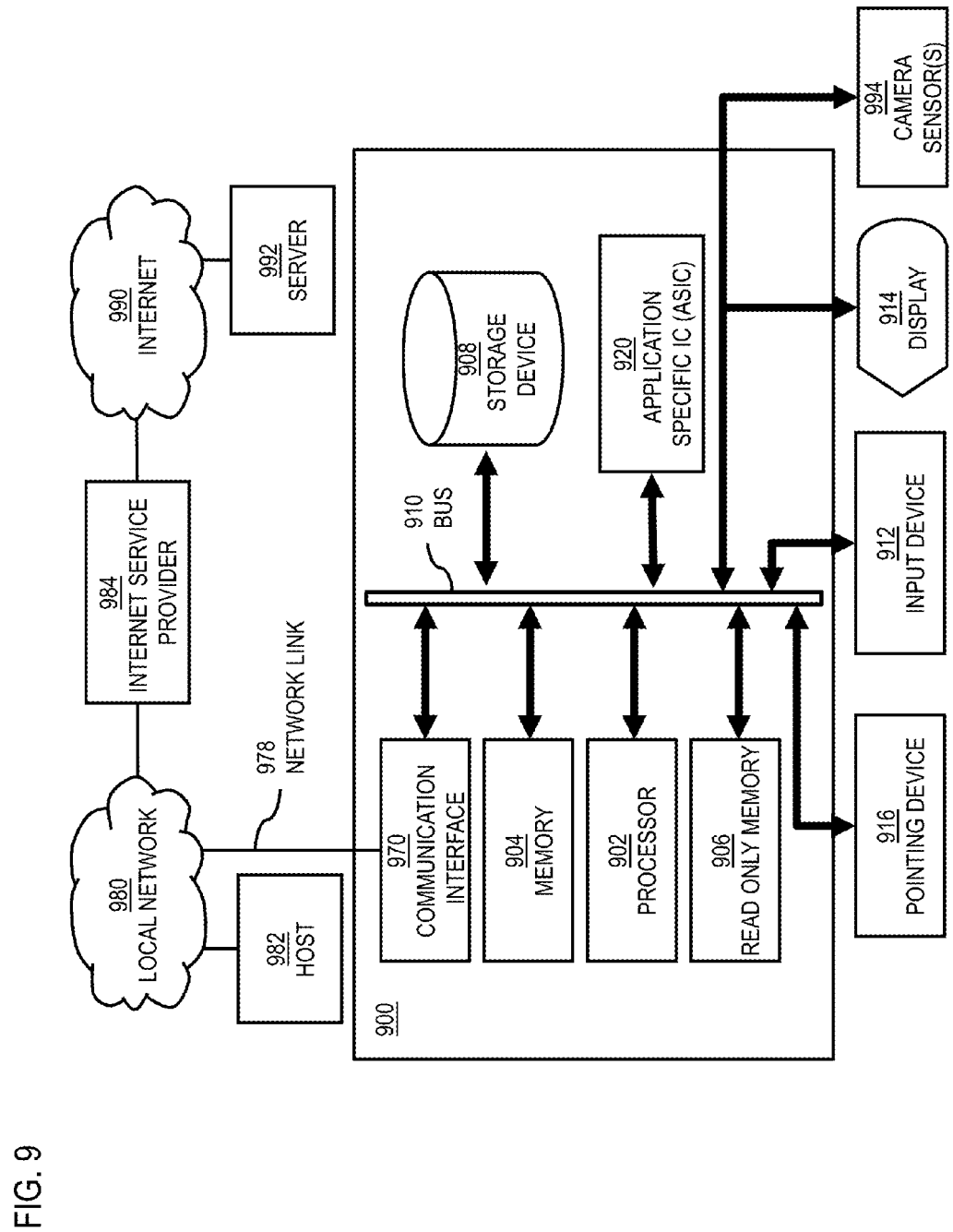
FIG. 9 is a diagram of hardware that can be used to implement an embodiment of the invention.

FIG. 9 illustrates a computer system 900 upon which an embodiment of the invention may be implemented. Although computer system 900 is depicted with respect to a particular device or equipment, it is contemplated that other devices or equipment (e.g., network elements, servers, etc.) within FIG. 9 can deploy the illustrated hardware and components of system 900. Computer system 900 is programmed (e.g., via computer program code or instructions) to determine whether to include the at least one route segment in a navigation route based, at least in part, on a minimization of a risk of being blocked by the one or more non-travel lanes as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 900, or a portion thereof, constitutes a means for performing one or more steps of determining whether to include the at least one route segment in a navigation route based, at least in part, on a minimization of a risk of being blocked by the one or more non-travel lanes.

A bus 910 includes one or more parallel conductors of information so that information is transferred quickly among devices coupled to the bus 910. One or more processors 902 for processing information are coupled with the bus 910.

A processor (or multiple processors) 902 performs a set of operations on information as specified by computer program code related to determine whether to include the at least one route segment in a navigation route based, at least in part, on a minimization of a risk of being blocked by the one or more non-travel lanes. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 900 also includes a memory 904 coupled to bus 910. The memory 904, such as a random access memory (RAM) or any other dynamic storage device, stores information including processor instructions for determining whether to include the at least one route segment in a navigation route based, at least in part, on a minimization of a risk of being blocked by the one or more non-travel lanes. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or any other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for determining whether to include the at least one route segment in a navigation route based, at least in part, on a minimization of a risk of being blocked by the one or more non-travel lanes, is provided to the bus 910 for use by the processor from an external input device 912, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT), a liquid crystal display (LCD), a light emitting diode (LED) display, an organic LED (OLED) display, a plasma screen, or a printer for presenting text or images, and a pointing device 916, such as a mouse, a trackball, cursor direction keys, or a motion sensor, for controlling a position of a small cursor image presented on the display 914 and issuing commands associated with graphical elements presented on the display 914, and one or more camera sensors 994 for capturing, recording and causing to store one or more still and/or moving images (e.g., videos, movies, etc.) which also may comprise audio recordings. In some embodiments, for example, in embodiments in which the computer system 900 performs all functions automatically without human input, one or more of external input device 912, display device 914 and pointing device 916 may be omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of ASICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 105 for determining whether to include the at least one route segment in a navigation route based, at least in part, on a minimization of a risk of being blocked by the one or more non-travel lanes to the UE 101.

The term "computer-readable medium" as used herein refers to any medium that participates in providing information to processor 902, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 908. Volatile media include, for example, dynamic memory 904. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 920.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system 900 can be deployed in various configurations within other computer systems, e.g., host 982 and server 992.

At least some embodiments of the invention are related to the use of computer system 900 for implementing some or all of the techniques described herein. According to one embodiment of the invention, those techniques are performed by computer system 900 in response to processor 902 executing one or more sequences of one or more processor instructions contained in memory 904. Such instructions, also called computer instructions, software and program code, may be read into memory 904 from another computer-readable medium such as storage device 908 or network link 978. Execution of the sequences of instructions contained in memory 904 causes processor 902 to perform one or more of the method steps described herein. In alternative embodiments, hardware, such as ASIC 920, may be used in place of or in combination with software to implement the invention. Thus, embodiments of the invention are not limited to any specific combination of hardware and software, unless otherwise explicitly stated herein.

The signals transmitted over network link 978 and other networks through communications interface 970, carry information to and from computer system 900. Computer system 900 can send and receive information, including program code, through the networks 980, 990 among others, through network link 978 and communications interface 970. In an example using the Internet 990, a server host 992 transmits program code for a particular application, requested by a message sent from computer 900, through Internet 990, ISP equipment 984, local network 980 and communications interface 970. The received code may be executed by processor 902 as it is received, or may be stored in memory 904 or in storage device 908 or any other non-volatile storage for later execution, or both. In this manner, computer system 900 may obtain application program code in the form of signals on a carrier wave.

Various forms of computer readable media may be involved in carrying one or more sequence of instructions or data or both to processor 902 for execution. For example, instructions and data may initially be carried on a magnetic disk of a remote computer such as host 982. The remote computer loads the instructions and data into its dynamic memory and sends the instructions and data over a telephone line using a modem. A modem local to the computer system 900 receives the instructions and data on a telephone line and uses an infra-red transmitter to convert the instructions and data to a signal on an infra-red carrier wave serving as the network link 978. An infrared detector serving as communications interface 970 receives the instructions and data carried in the infrared signal and places information representing the instructions and data onto bus 910. Bus 910 carries the information to memory 904 from which processor 902 retrieves and executes the instructions using some of the data sent with the instructions. The instructions and data received in memory 904 may optionally be stored on storage device 908, either before or after execution by the processor 902.

FIG. 10 illustrates a chip set or chip 1000 upon which an embodiment of the invention may be implemented. Chip set 1000 is programmed to determine whether to include the at least one route segment in a navigation route based, at least in part, on a minimization of a risk of being blocked by the one or more non-travel lanes as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1000 can be implemented in a single chip. It is further contemplated that in certain embodiments the chip set or chip 1000 can be implemented as a single "system on a chip." It is further contemplated that in certain embodiments a separate ASIC would not be used, for example, and that all relevant functions as disclosed herein would be performed by a processor or processors. Chip set or chip 1000, or a portion thereof, constitutes a means for performing one or more steps of providing user interface navigation information associated with the availability of functions. Chip set or chip 1000, or a portion thereof, constitutes a means for performing one or more steps of determining whether to include the at least one route segment in a navigation route based, at least in part, on a minimization of a risk of being blocked by the one or more non-travel lanes.

In one embodiment, the chip set or chip 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1000 includes merely one or more processors and some software and/or firmware supporting and/or relating to and/or for the one or more processors.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to determine whether to include the at least one route segment in a navigation route based, at least in part, on a minimization of a risk of being blocked by the one or more non-travel lanes. The memory 1005 also stores the data associated with or generated by the execution of the inventive steps.

Figure 11:
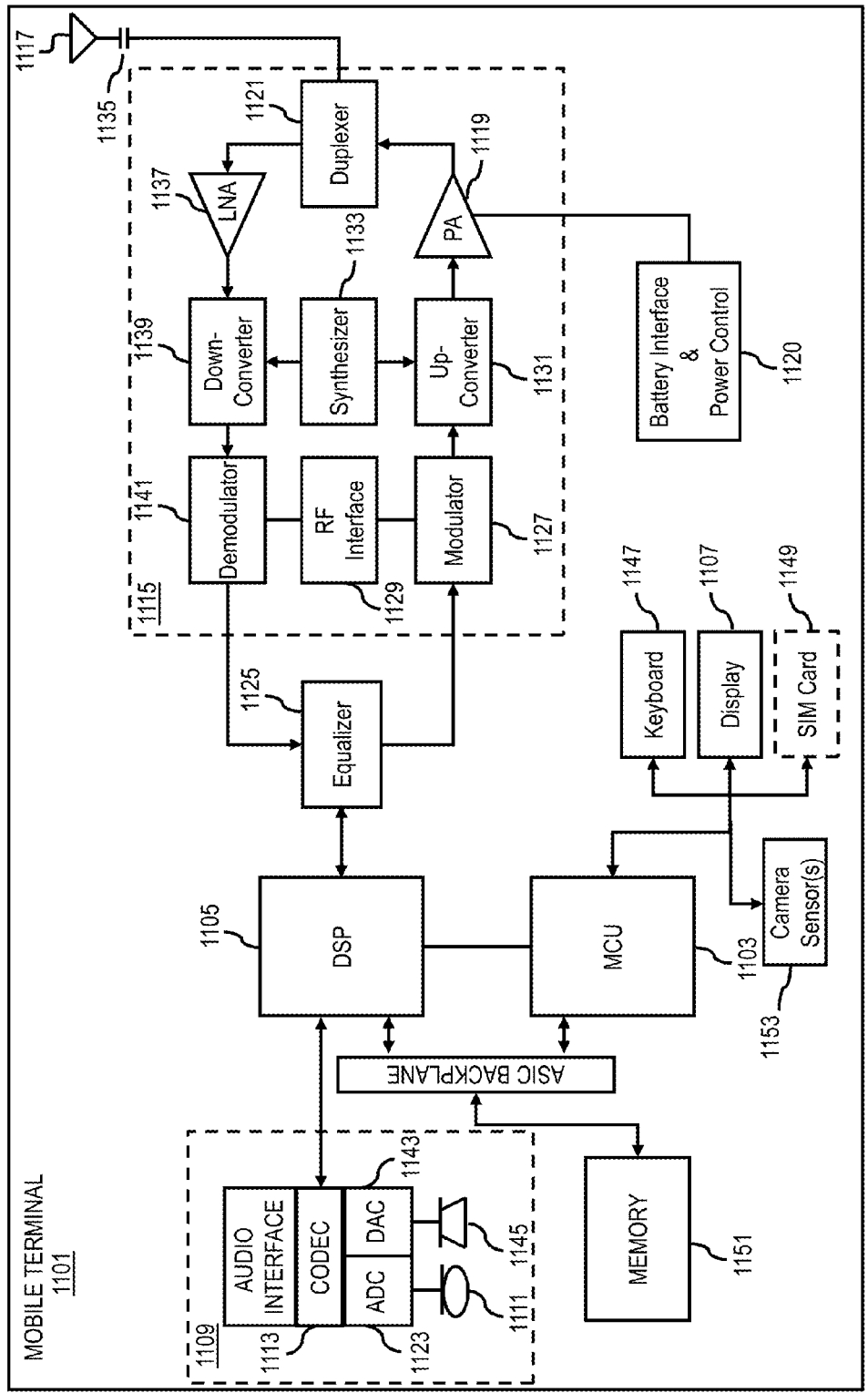
FIG. 11 is a diagram of a mobile terminal (e.g., handset) that can be used to implement an embodiment of the invention.

FIG. 11 is a diagram of exemplary components of a mobile terminal (e.g., handset) for communications, which is capable of operating in the system of FIG. 1, according to one embodiment. In some embodiments, mobile terminal 1101, or a portion thereof, constitutes a means for performing one or more steps of determining whether to include the at least one route segment in a navigation route based, at least in part, on a minimization of a risk of being blocked by the one or more non-travel lanes. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile terminal functions that perform or support the steps of determining whether to include the at least one route segment in a navigation route based, at least in part, on a minimization of a risk of being blocked by the one or more non-travel lanes. The display 1107 includes display circuitry configured to display at least a portion of a user interface of the mobile terminal (e.g., mobile telephone). Additionally, the display 1107 and display circuitry are configured to facilitate user control of at least some functions of the mobile terminal. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile terminal 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, any other mobile phone or a landline connected to a Public Switched Telephone Network (PSTN), or other telephony networks.

Voice signals transmitted to the mobile terminal 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103 which can be implemented as a Central Processing Unit (CPU).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile terminal 1101 to determine whether to include the at least one route segment in a navigation route based, at least in part, on a minimization of a risk of being blocked by the one or more non-travel lanes. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the terminal. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile terminal 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable storage medium known in the art. The memory device 1151 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1149 carries, for instance, important information, such as the cellular phone number, the carrier supplying service, subscription details, and security information. The SIM card 1149 serves primarily to identify the mobile terminal 1101 on a radio network. The card 1149 also contains a memory for storing a personal telephone number registry, text messages, and user specific mobile terminal settings.

Further, one or more camera sensors 1153 may be incorporated onto the mobile station 1101 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer-implemented method of providing a navigation service comprising facilitating a processing of and/or processing (1) data and/or (2) information and/or (3) at least one signal, the method comprising:
   obtaining data from a location database, the data comprising information with respect to at least one travel route segment including current information on travel and non-travel lanes within the at least one travel route segment;
   making determinations based on the data, the determinations comprising;
   at least one determination of one or more non-travel lanes in at least one route segment; and
   at least one determination of whether to include the at least one route segment in a navigation route based, at least in part, on a minimization of a risk of being blocked by the one or more non-travel lanes during a time a user is projected to travel; and
   recommending the navigation route to the user of the navigation service based on the determinations.

2. A method of claim 1, further comprising:
   at least one determination of the risk of being blocked by the one or more non-travel lanes based, at least in part, on a number of the one or more non-travel lanes included in the navigation route;
   at least one determination of at least one ratio of the number of the one or more non-travel lanes to another number of one or more travel lanes in the at least one route segment,
   wherein (a) the determination of whether to include the at least one route segment in the navigation route, (b) the minimization of the risk of being blocked , or (c) a combination thereof is based, at least in part, on the at least one ratio.

3. A method of claim 2, further comprising:
   at least one determination of a probability of obstructed travel through the at least one route segment resulting from vehicle movement between the one or more non-travel lanes and the one or more travel lanes,
   wherein (a) the determination of whether to include the at least one route segment in the navigation route, (b) the minimization of the risk of being blocked , or (c) a combination thereof is further based, at least in part, on the probability.

4. A method of claim 3, wherein the probability of obstructed travel, the risk of being blocked, or a combination thereof is determined based, at least in part, on the location database information comprising historical information, current information, or a combination thereof.

5. A method of claim 1, further comprising:
   at least one determination of one or more characteristics of the one or more non-travel lanes,
   wherein (a) the determination of whether to include the at least one route segment in the navigation route, (b) the minimization of the risk of being blocked, or (c) a combination thereof is based, at least in part, on the one or more characteristics.

6. A method of claim 5, wherein the one or more characteristics include physical dimension information.

7. A method of claim 1, further comprising:
   at least one determination of a weighting factor for the at least one route segment based, at least in part, on the one or more travel lanes,
   wherein (a) the determination of whether to include the at least one route segment in the navigation route, (b) the minimization of the risk of being blocked , or (c) a combination thereof is based, at least in part, on the weighting factor.

8. A method of claim 1, wherein the one or more non-travel lanes include, at least in part, one or more parking lanes, one or more pedestrian lanes, one or more bicycling lanes, one or more public transportation lanes, one or more loading lanes, one or more restricted lanes, or a combination thereof.

9. An apparatus comprising a navigation service, the apparatus comprising:
   at least one processor; and
   at least one memory including computer program code for one or more programs,
   the at least one memory and the computer program code configured to, with the at least one processor, cause the apparatus to perform at least the following,
      obtain data from a location database, the data comprising information with respect to at least one travel route segment including current information on travel and non-travel lanes within the at least one travel route segment;
      make determinations based on the data, the determinations comprising;
      determine one or more non-travel lanes in at least one route segment;
      determine whether to include the at least one route segment in a navigation route based, at least in part, on a minimization of a risk of being blocked by the one or more non-travel lanes during a time a user is projected to travel; and
      recommend the navigation route to the user of the navigation service based on the determinations.

10. An apparatus of claim 9, wherein the apparatus is further caused to:
   determine the risk of being blocked by the one or more non-travel lanes based, at least in part, on a number of the one or more non-travel lanes included in the navigation route;
   determine at least one ratio of the number of the one or more non-travel lanes to another number of one or more travel lanes in the at least one route segment,
   wherein (a) the determination of whether to include the at least one route segment in the navigation route, (b) the minimization of the risk of being blocked , or (c) a combination thereof is based, at least in part, on the at least one ratio.

11. An apparatus of claim 10, wherein the apparatus is further caused to:
   determine a probability of obstructed travel through the at least one route segment resulting from vehicle movement between the one or more non-travel lanes and the one or more travel lanes,
   wherein (a) the determination of whether to include the at least one route segment in the navigation route, (b) the minimization of the risk of being blocked , or (c) a combination thereof is further based, at least in part, on the probability.

12. An apparatus of claim 11, wherein the probability of obstructed travel, the risk of being blocked, or a combination thereof is determined based, at least in part, on the location database information comprising historical information, current information, or a combination thereof.

13. An apparatus of claim 9, wherein the apparatus is further caused to:
   determine one or more characteristics of the one or more non-travel lanes,
   wherein (a) the determination of whether to include the at least one route segment in the navigation route, (b) the minimization of the risk of being blocked, or (c) a combination thereof is based, at least in part, on the one or more characteristics.

14. An apparatus of claim 13, wherein the one or more characteristics include physical dimension information.

15. An apparatus of claim 9, wherein the apparatus is further caused to:
   determine a weighting factor for the at least one route segment based, at least in part, on the one or more travel lanes,
   wherein (a) the determination of whether to include the at least one route segment in the navigation route, (b) the minimization of the risk of being blocked , or (c) a combination thereof is based, at least in part, on the weighting factor.

16. An apparatus of claim 9, wherein the one or more non-travel lanes include, at least in part, one or more parking lanes, one or more pedestrian lanes, one or more bicycling lanes, one or more public transportation lanes, one or more loading lanes, one or more restricted lanes, or a combination thereof.

17. A non-transitory computer-readable storage medium carrying one or more sequences of one or more instructions which, when executed by one or more processors, cause an apparatus to at least perform the following steps:
   obtain data from a location database, the data comprising information with respect to at least one travel route segment including current information on travel and non-travel lanes within the at least one travel route segment;
   make determinations based on the data, the determinations comprising;
   determining one or more non-travel lanes in at least one route segment;
   determining whether to include the at least one route segment in a navigation route based, at least in part, on a minimization of a risk of being blocked by the one or more non-travel lanes during a time a user is projected to travel; and
   recommending the navigation route to the user of the navigation service based on the determinations.

18. A computer-readable storage medium of claim 17, wherein the apparatus is further caused to perform the following steps:
   determining the risk of being blocked by the one or more non-travel lanes based, at least in part, on a number of the one or more non-travel lanes included in the navigation route determining at least one ratio of the number of the one or more non-travel lanes to another number of one or more travel lanes in the at least one route segment,
   wherein (a) the determination of whether to include the at least one route segment in the navigation route, (b) the minimization of the risk of being blocked , or (c) a combination thereof is based, at least in part, on the at least one ratio.

19. A computer-readable storage medium of claim 18, wherein the apparatus is further caused to perform the following steps:
   determining a probability of obstructed travel through the at least one route segment resulting from vehicle movement between the one or more non-travel lanes and the one or more travel lanes,
   wherein (a) the determination of whether to include the at least one route segment in the navigation route, (b) the minimization of the risk of being blocked , or (c) a combination thereof is further based, at least in part, on the probability 20. A computer-readable storage medium of claim 19, wherein the probability of obstructed travel is determined based, at least in part, on the location database information comprising historical information, current information, or a combination thereof.

* * * * *